(12) United States Patent
Ma et al.

(10) Patent No.: US 12,130,139 B2
(45) Date of Patent: Oct. 29, 2024

(54) MEMS GYROSCOPE FOR THREE-AXIS DETECTION

(71) Applicant: AAC Kaitai Technologies (Wuhan) CO., LTD, Hubei (CN)

(72) Inventors: Zhao Ma, Shenzhen (CN); Zhan Zhan, Shenzhen (CN); Xiao Kan, Shenzhen (CN); Shan Yang, Shenzhen (CN); Shitao Yan, Shenzhen (CN); Hongtao Peng, Shenzhen (CN); Yang Li, Shenzhen (CN); Kahkeen Lai, Singapore (SG); Veronica Tan, Singapore (SG)

(73) Assignee: AAC Kaitai Technologies (Wuhan) CO., LTD, Wuhan (CN)

( * ) Notice: Subject to any disclaimer, the term of this patent is extended or adjusted under 35 U.S.C. 154(b) by 330 days.

(21) Appl. No.: 17/875,387

(22) Filed: Jul. 27, 2022

(65) Prior Publication Data

US 2023/0266125 A1    Aug. 24, 2023

(30) Foreign Application Priority Data

Feb. 22, 2022    (CN) .......................... 202220361609.1

(51) Int. Cl.
*G01C 19/5747*        (2012.01)
(52) U.S. Cl.
CPC .............................. *G01C 19/5747* (2013.01)

(58) Field of Classification Search
CPC .......................... G01C 19/56; G01C 19/5719; G01C 19/5733; G01C 19/574; G01C 19/5747; G01C 19/5783
See application file for complete search history.

(56) References Cited

U.S. PATENT DOCUMENTS

| | | | |
|---|---|---|---|
| 2013/0233076 A1* | 9/2013 | Schofield | G01C 19/56 73/504.12 |
| 2018/0112981 A1* | 4/2018 | Tocchio | G01C 19/5747 |
| 2020/0096337 A1* | 3/2020 | Senkal | G01C 19/5733 |

* cited by examiner

*Primary Examiner* — Benjamin R Schmitt
(74) *Attorney, Agent, or Firm* — W&G Law Group

(57) ABSTRACT

A MEMS gyroscope for three-axis detection relates to the technical field of gyroscope and includes a substrate, a sensing unit elastically connected with the substrate, and a driving unit coupled with the sensing unit and driving the sensing unit to move. The substrate includes anchor point structures respectively located at four corners of the substrate and four coupling structures respectively elastically connected with the four anchor point structures. An avoiding space is formed between two adjacent coupling structures. The driving unit includes two driving pieces separately elastically connected with adjacent coupling structures. The two driving pieces are symmetrically arranged and are frame-shaped. The sensing unit includes four X and Y mass blocks, two Z mass blocks elastically connected with the driving pieces, and two decoupling mass blocks. The two decoupling mass blocks are elastically connected. The MEMS gyroscope is differentially driven, which realizes differential detection and reduces quadrature error.

10 Claims, 10 Drawing Sheets

MEMS GYROSCOPE FOR THREE-AXIS DETECTION

TECHNICAL FIELD

The present disclosure relates to a field of MEMS gyroscope technology, and in particular to a MEMS gyroscope for three-axis detection

BACKGROUND

Micro-electro-mechanical system (MEMS) gyroscope, also known as silicon micro-electromechanical gyroscope, is a miniature angular velocity sensor produced by applying micromachining technology and microelectronic technology.

MEMS out-of-plane oscillating gyroscope is a typical representative of MEMS out-of-plane detecting gyroscopes. In a drive mode, a MEMS oscillating gyroscope oscillates around an axis perpendicular to mass blocks. When an angular velocity Ω is applied, the MEMS oscillating gyroscope transfers energy and is switched to a sense mode due to the Coriolis effect, which indirectly drives a vibrating disk to oscillate out-of-plane. A value of the angular velocity Ω is obtained by detecting a displacement of the out-of-plane oscillation.

US patent application publication no. U.S. Pat. No. 8,459,110B2 discloses an orthogonally arranged three-axis gyroscope with four mass blocks, whose structure determine that sense modes of the three axes are coupled with each other, and errors are superimposed, resulting in excessive errors.

In order to overcome the above defects in the prior art, it is necessary to develop a MEMS gyroscope capable of detecting three axis independently to realize differential detection.

SUMMARY

A purpose of the present disclosure is to provide a micro-electro-mechanical system (MEMS) gyroscope for three-axis detection, which is configured to solve a problem that sense modes of the three axes of a conventional MEMS gyroscope are coupled with each other and errors are superimposed, resulting in excessive detection errors in the prior art.

The present disclosure provides a MEMS gyroscope for three-axis detection. The MEMS gyroscope for three-axis detection comprises a substrate, a sensing unit elastically connected with the substrate, and a driving unit coupled with the sensing unit and driving the sensing unit to move. The substrate is in a shape of a rectangle. The substrate comprises four anchor point structures respectively located at four corners of the substrate and four coupling structures respectively elastically connected with the four anchor point structures. An avoiding space is formed between each two adjacent coupling structures. The driving unit comprises two driving pieces located at inner sides of two opposite sides of the substrate. Two ends of each of the two driving pieces are separately elastically connected with adjacent coupling structures. The two driving pieces are symmetrically arranged and are frame-shaped. The sensing unit comprises four X and Y mass blocks, two Z mass blocks, and two decoupling mass blocks. Each of the four X and Y mass blocks is arranged in a corresponding avoiding space. The four X and Y mass blocks are respectively elastically connected with adjacent coupling structures to form a rectangular frame. Each of the Z mass blocks is elastically connected with a corresponding driving piece and is arranged in the corresponding driving piece. Each of the two decoupling mass blocks is elastically connected with a corresponding Z mass block and is arranged in the corresponding Z mass block. The two decoupling mass blocks are elastically connected with each other.

In the present disclosure, the four X and Y mass blocks are coupled and connected with form a rectangular frame. The driving pieces are symmetrically arranged in the rectangular frame. The Z mass blocks are arranged in the driving pieces that are symmetrical arranged. Two decoupling mass blocks elastically connected with the Z mass blocks are arranged in the Z mass blocks. By such arrangement, vibration detection of the three axial directions are decoupled, which fundamentally ensure an independent detection of the three axes.

Furthermore, each of the anchor point structures comprises a plurality of sub-anchor points with a same shape and arranged at intervals. Each of the coupling structures comprises a coupling ring sleeved on outer sides of corresponding sub-anchor points. An inner side of each coupling ring extends inward toward a space between the corresponding sub-anchor points to form first coupling beams connected with the corresponding sub-anchor points. The first coupling beams of each coupling ring extend inward toward the space of the corresponding sub-anchor points.

Furthermore, each of the X and Y mass blocks comprises first coupling connecting positions close to a corresponding coupling structure. Each of the coupling structures further comprises connecting portions extending outward from an outer side of each coupling ring and first flexible beams. Each of the first flexible beams extends from one end of a corresponding connecting portion to a corresponding first coupling connecting position and is connected with a corresponding X and Y mass block.

Furthermore, each of the driving piece comprises corner portions. An outer wall of each of the corner portions close to a corresponding coupling ring extends outward to form a connecting beam, one end of each connecting beam away from a corresponding driving piece is connected with an outer wall of a corresponding coupling ring.

Furthermore, the substrate further comprises driving piece anchor points. Each of the driving piece anchor points is arranged between one end of a corresponding driving piece and a corresponding X and Y mass block. Each of the driving piece comprises four corner portions. A guiding beam is formed on an outer wall of each of the corner portions. Each guiding beam is perpendicular to a moving direction of a corresponding driving piece. One end of each guiding beam away from the corresponding driving piece is connected with a corresponding driving piece anchor point. Each guiding beam is arranged between a gap between an outer wall of the corresponding driving piece and an inner wall of a corresponding X and Y mass block.

Furthermore, each of the Z mass blocks is arranged in the corresponding driving piece. Each of the Z mass blocks is a frame structure. An outer wall of each of the Z mass blocks and an inner wall of the corresponding driving piece are spaced apart to form a gap. Outer walls of four corners of each of the Z mass blocks extend to form second flexible beams. One end of each of the second flexible beams away from each of the Z mass blocks is connected with a corresponding driving piece.

Furthermore, each of the decoupling mass blocks is a frame structure. A shape of the decoupling mass blocks matches a shape of the Z mass blocks. Each of the decoupling mass blocks is embedded in the corresponding Z mass block and is spaced from the corresponding Z mass block to form a narrow slit. Outer walls of two symmetrical frames of each of the decoupling mass blocks extend outward to form third flexible beams. The third flexible beams of each of the decoupling mass blocks are arranged in the narrow slit of the corresponding Z mass block and are connected with inner walls of the corresponding Z mass block.

Furthermore, a second coupling beam is elastically connected between the two decoupling mass blocks. A long narrow slit is formed between the two driving pieces. The second coupling beam is arranged in the long narrow slit. The substrate further comprises coupling beam anchor points. The second coupling beam anchor points are arranged on two ends of the second coupling beam. The two ends of the second coupling beam are connected with the coupling beam anchor points.

Furthermore, the X and Y mass block are in a shape of a rectangular strip. The substrate further comprises mass anchor points arranged at intervals at center points of the X and Y mass blocks. A mass flexible beam extends from a center point of each of the X and Y mass blocks to connect with a corresponding mass anchor point.

Furthermore, a driving transducer is arranged in each of the driving piece. An X and Y surface detecting transducer is arranged in each of the X and Y mass blocks. A Z surface detecting transducer is arranged in each of decoupling mass block connected with the corresponding Z mass block.

In the present disclosure, the X and Y mass blocks are connected through the coupling structures and then are elastically connected with the driving pieces. The Z mass blocks are elastically connected with the driving pieces and the driving pieces are symmetrically arranged. The Z mass blocks embedded in the driving pieces are also symmetrically arranged. Each of the decoupling mass blocks are elastically connected with the corresponding Z mass blocks and are symmetrically arranged. By arrangement of the decoupling mass blocks, coupling between motions in the different modes of the X and Y mass block and the Z mass block is effectively reduced, interference of the motions of different modes is avoided, a displacement of non-moving mass blocks is reduced, and a quadrature error is reduced, which is beneficial to bias stability of the sensing unit. In addition, the above structural design realizes that a drive mode of the MEMS gyroscope for three-axis detection is differential drive, which effectively improve stability of the MEMS gyroscope for three-axis detection.

In the design of the whole MEMS gyroscope for three-axis detection, the X and Y mass blocks and the Z mass blocks are elastically connected through the decoupling mass blocks. By such arrangement, anti-phase motion between different mass blocks is realized, which provides a structural basis for the formation of differential detection. In sense modes of X, Y, and Z axes, the MEMS gyroscope for three-axis detection realizes anti-phase vibration, so the differential detection of the MEMS gyroscope for three-axis detection is realized, which effectively avoid the influence of acceleration shock and quadrature error, and further reduce the coupling of detection errors of different axes and improve detection accuracy.

The detection electrodes (also known as detection circulator) are arranged symmetrically accordingly with the mass block, which truly realize the differential detection.

DETAILED DESCRIPTION

The present disclosure will be further described below with reference to the accompanying drawings and embodiments.

Figure 1:
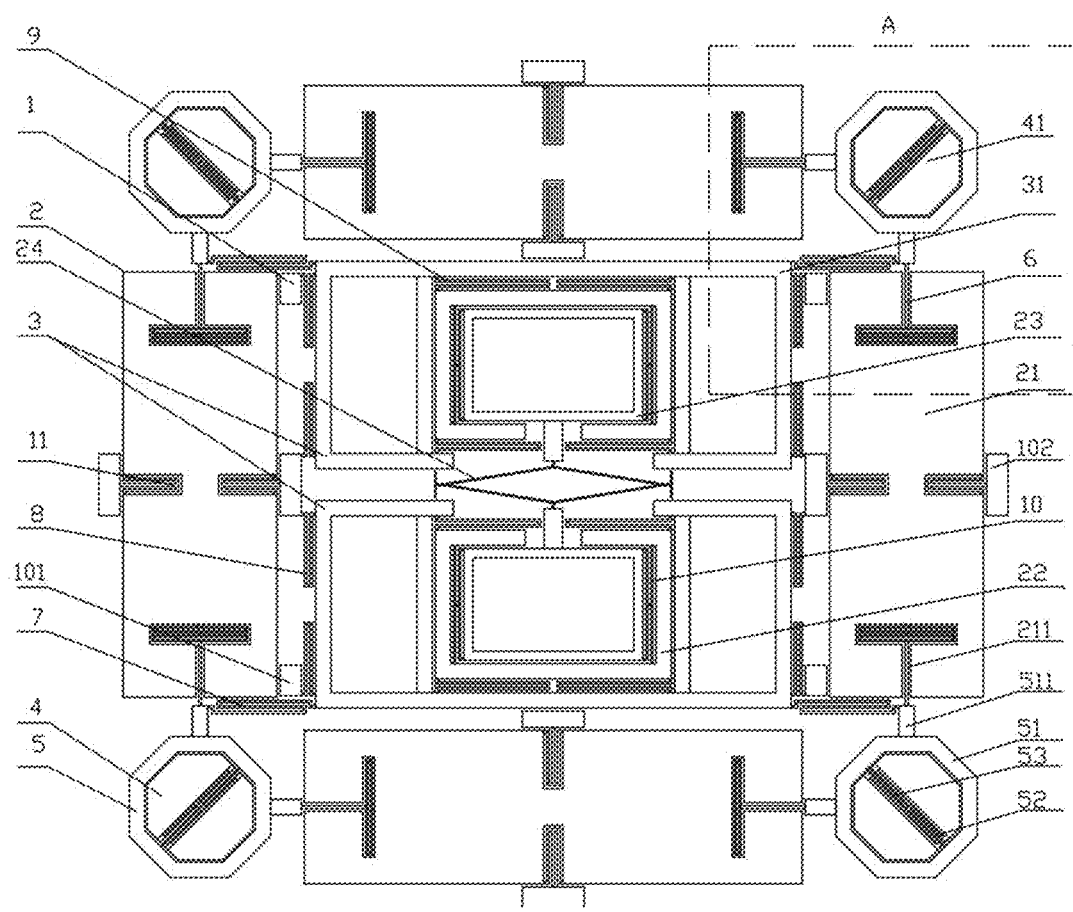
FIG. 1 is a plan schematic diagram of a MEMS gyroscope for three-axis detection of the present disclosure.

FIG. 1 is a plan schematic diagram of a MEMS gyroscope for three-axis detection of the present disclosure. As shown in FIG. 1, the present disclosure provides a MEMS gyroscope for three-axis detection. The MEMS gyroscope for three-axis detection comprises a substrate 1 (in FIG. 1, the substrate is a plate structure and is arranged below other components, so it is shown blank in the figure), a sensing unit 2 elastically connected with the substrate 1, and a driving unit 3 coupled with the sensing unit 2 and driving the sensing unit 2 to move. The substrate 1 is in a shape of a rectangle. The substrate 1 comprises four anchor point structures 4 respectively located at four corners of the substrate and four coupling structures 5 respectively elastically connected with the four anchor point structures 4. An avoiding space is formed between each two adjacent coupling structures 5. Four coupling structures 5 are provides, so there are four avoiding spaces accordingly. The driving unit 3 comprises two driving pieces 31 located at inner sides of two opposite sides of the substrate 1. Two ends of each of the two driving pieces 31 are separately elastically connected with adjacent coupling structures 5. The two driving pieces 31 are symmetrically arranged and are frame-shaped. Specifically, the driving pieces 31 are rectangular frame-shaped. The sensing unit 2 comprises four X and Y mass blocks 21, two Z mass blocks 22, and two decoupling mass blocks 23. Each of the four X and Y mass blocks 21 is arranged in a corresponding avoiding space. The four X and Y mass blocks 21 are respectively elastically connected with adjacent coupling structures 5 to form a rectangular frame. Each of the Z mass blocks 22 is elastically connected with a corresponding driving piece 31 and is arranged in the corresponding driving piece 31. Each of the two decoupling mass blocks 23 is elastically connected with a corresponding Z mass block 23 and is arranged in the corresponding Z mass block 23. The two decoupling mass blocks 23 are elastically connected with each other.

In one embodiment, the X and Y mass blocks 21 are in the shape of a rectangular strip. Lateral slits are formed on long sides of each of the X and Y mass blocks 21. The substrate further comprises mass anchor points 102 arranged at intervals at center points of the X and Y mass blocks 21. A mass flexible beam 11 extends from a center point of each of the X and Y mass blocks 21 to connect with a corresponding mass anchor point 102.

Figure 2:
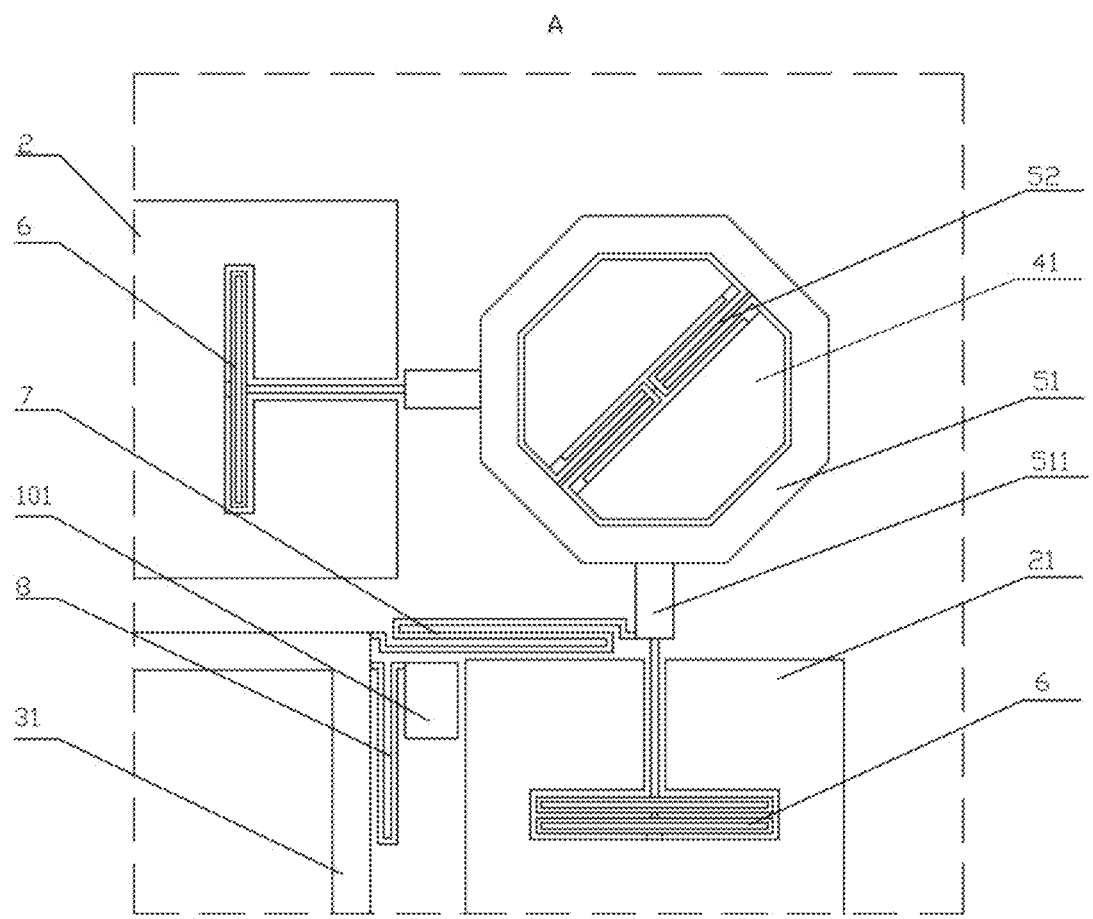
FIG. 2 is an enlarged view of portion A shown in FIG. 1.

FIG. 2 is an enlarged view of portion A shown in FIG. 1. As shown in FIG. 2. each of the anchor point structures 4 comprises two sub-anchor points 41 with a same shape and arranged at intervals. Each of the coupling structures 5 comprises a coupling ring 51 sleeved on outer sides of the two sub-anchor points 41. An inner side of each coupling ring 51 extends inward toward a space between corresponding two sub-anchor points 41 to form first coupling beams 52 connected with the corresponding two sub-anchor points 41. In the embodiment, each coupling ring 51 comprises two first coupling beams 52 that are symmetrically arranged. The two first coupling beams 52 of each coupling ring 51 have a same structure. Each of the first coupling beams 52 comprises a bending portion 53 extending to the space between the corresponding two sub-anchor points. The two bending portion of each coupling ring 51 may occupy an entire space between the corresponding two sub-anchor points 41.

In one embodiment of the present disclosure, each coupling ring 51 is in a shape of a regular octagon. The two sub-anchor points 41 of each of the anchor point structures 4 are symmetrically arranged to form a regular octagon, so as to match with the shape of the corresponding coupling ring 5. That is, each of the sub-anchor points 41 is approximately half of a regular octagon.

In another embodiment of the present disclosure, each of the X and Y mass blocks 21 comprises first coupling connecting position 211 close to a corresponding coupling ring 51. Each coupling ring 51 further comprises connecting portions 511 extending outward from an outer side of each coupling ring 51 and first flexible beams 6. Each of the first flexible beams 6 extends from one end of a corresponding connecting portion 511 to a corresponding first coupling connecting position 211 and is connected with a corresponding X and Y mass block 21. Each of the first coupling connecting position 211 may be arranged in a T shape, and each of the first flexible beams 6 is correspondingly arranged in a T shape.

In another embodiment of the present disclosure, each of the driving piece 31 comprises corner portions. An outer wall of each of the corner portions close to a corresponding coupling ring 51 extends outward to form a connecting beam 7. Each connecting beam 7 has a bending portion. Each connecting beam 7 is bent. One end of each connecting beam 7 away from a corresponding driving piece 31 is connected with an outer wall of a corresponding coupling ring 51. Four connecting beams 7 are provided. The four connecting beams 7 have a same structure and are elastically connected with the two driving pieces 31 and the four octagonal coupling rings 51 respectively. The two driving pieces 31 are rectangular shaped. The two rectangular driving pieces are symmetrically arranged in a larger rectangular frame composed of the four X and Y mass blocks 21 and four coupling rings 51, and are close to two opposite inner edges of the larger rectangular frame.

In another embodiment of the present disclosure, the substrate 1 further comprises driving piece anchor points 101. Each of the driving piece anchor points 101 is arranged between one end of a corresponding driving piece 31 and a corresponding X and Y mass block 21. Each of the driving piece 31 comprises four corner portions. A guiding beam 8 is formed on an outer wall of each of the corner portions. Each guiding beam 8 is perpendicular to a moving direction of a corresponding driving piece 31. One end of each guiding beam 8 away from the corresponding driving piece 31 is connected with a corresponding driving piece anchor point 101. Each guiding beam 8 is arranged between a gap between an outer wall of the corresponding driving piece 31 and an inner wall of a corresponding X and Y mass block 21. Each guiding beam 8 bends and extends along a length direction of the gap between the outer wall of the corresponding driving piece 31 and the inner wall of the corresponding X and Y mass block 21 Each guiding beam 8 and each of the driving piece anchor points 101 are arranged between the gap between the outer wall of the corresponding driving piece 31 and the inner wall of the corresponding X and Y mass block 21. Each of the driving piece anchor points 101 is arranged on one corner portion of each of the driving pieces 31. The two driving pieces 31 comprise eight driving piece anchor points 101.

In another embodiment of the present disclosure, each of the Z mass blocks 22 is arranged in the corresponding driving piece 31. Each of the Z mass blocks 22 is a frame structure. An outer wall of each of the Z mass blocks 22 and an inner wall of the corresponding driving piece 31 are spaced apart to form a gap. Outer walls of four corners of each of the Z mass blocks 22 extend to form second flexible beams 9. Each of the second flexible beams 9 comprises a bending portion. One end of each of the second flexible beams 9 away from each of the Z mass blocks 22 is connected with a center of an inner wall of a long side of a corresponding driving piece 31. A bending direction of the bending portion of each of the second flexible beams 9 is parallel to a length direction of the Z mass blocks 22.

In another embodiment of the present disclosure, each of the decoupling mass blocks 23 is a frame structure. A shape of the decoupling mass blocks 23 matches a shape of the Z mass blocks 22. Each of the decoupling mass blocks 23 is embedded in the corresponding Z mass block 22 and is spaced from the corresponding Z mass block 22 to form a narrow slit. Outer walls of two symmetrical frames of each of the decoupling mass blocks 23 extend outward to form third flexible beams 10. The third flexible beams 10 of each of the decoupling mass blocks 23 are arranged in the narrow slit of the corresponding Z mass block 22 and are connected with inner walls of short sides of the corresponding Z mass block 22. The third flexible beams 10 of each of the decoupling mass blocks 23 fill the narrow slit of the corresponding Z mass block 22.

In another embodiment of the present disclosure, a second coupling beam 24 is elastically connected between the two decoupling mass blocks 23. The second coupling beam 24 is in the shape of a rhombus, A long narrow slit is formed between the two driving pieces 31 that are symmetrically arranged. The second coupling beam 24 is arranged in the long narrow slit. A longitudinal direction of the second coupling beam 24 is parallel to the length direction of the driving pieces 31. The substrate 1 further comprises coupling beam anchor points. The second coupling beam anchor points are arranged on two ends of the second coupling beam. The two ends of the second coupling beam are connected with the coupling beam anchor points.

Figure 3:
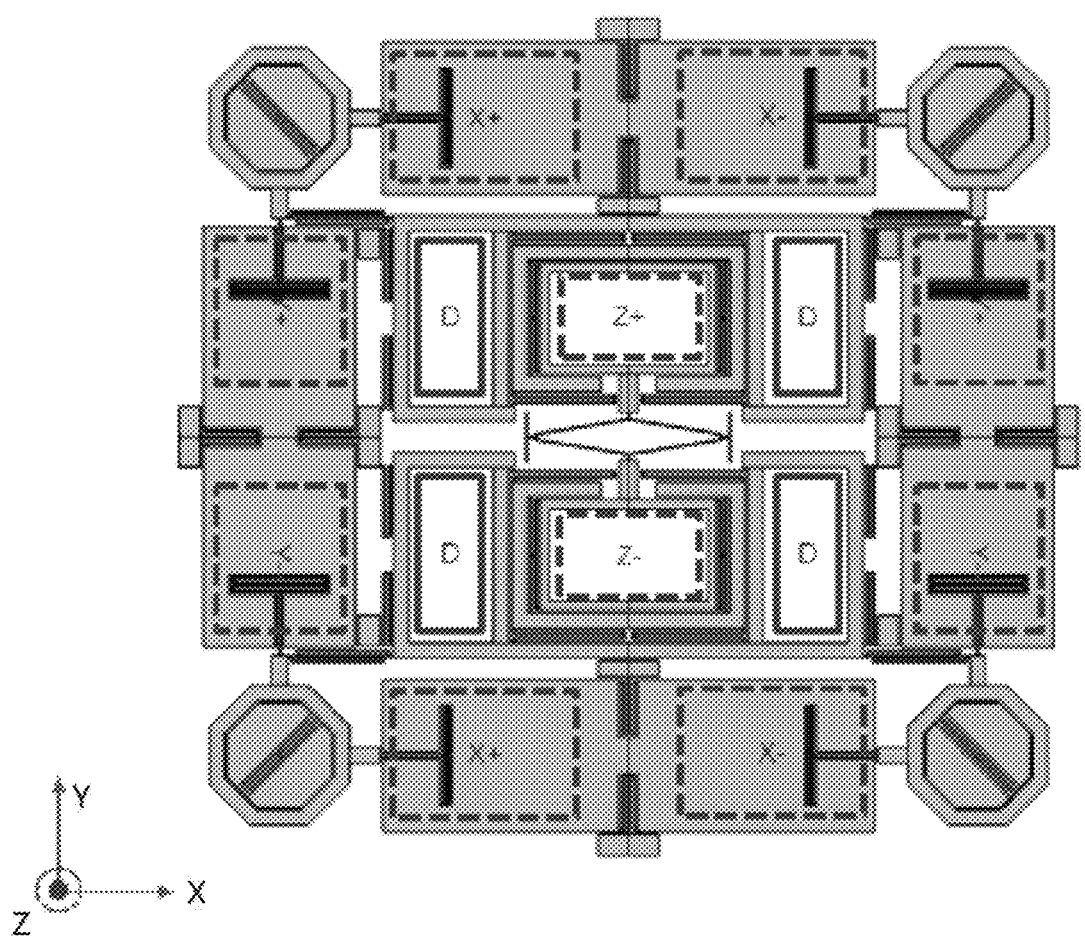
FIG. 3 is a top schematic diagram showing arrangement positions of detection circulator (also known as the detection electrode) and in-plane driving transducer (also known as in-plane driving electrodes) in the MEMS gyroscope for three-axis detection of the present disclosure.
Figure 4:
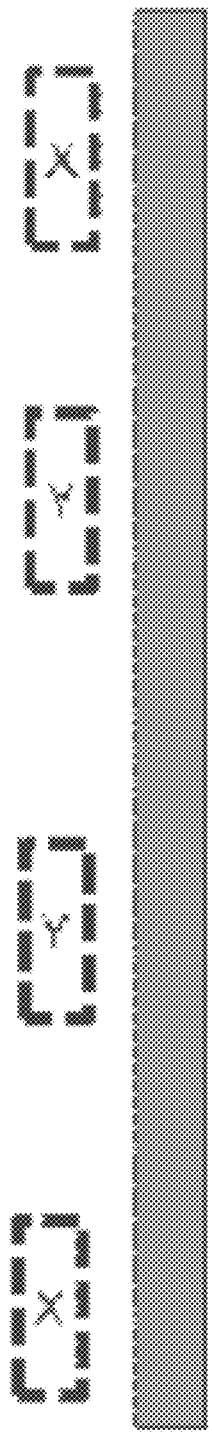
FIG. 4 is a side schematic diagram of FIG. 3.

FIG. 3 is a top schematic diagram showing arrangement positions of detection circulator (also known as the detection electrode) and in-plane driving transducer (also known as in-plane driving electrodes) in the MEMS gyroscope for three-axis detection of the present disclosure. FIG. 4 is a side view of FIG. 3. As shown in FIGS. 3 and 4, the short sides of each of the Z mass blocks 22 and the short sides of the corresponding driving pieces 31 are spaced apart to form a rectangular avoiding space. When in use, an in-plane driving transducer 12 is arranged in each rectangular avoiding space. The driving transducers 12 drive the driving pieces to vibrate. X surface detecting transducers 13 and Y surface detecting transducers 14 are respectively arranged symmetrically above the X and Y mass blocks 21. A Z surface detecting transducer 15 is arranged in the rectangular frame of each of decoupling mass block 23.

In the present disclosure, the driving pieces and the anchor points are connected through flexible beams. The flexible beams provide a single-direction degree of freedom in a plane where the X and Y mass blocks are located. The X and Y mass blocks are connected with the coupling rings through the first flexible beams. The first flexible beams provide degrees of freedom of in-plane rotation and out-of-plane inversion. The Z mass blocks are connected with the driving pieces through the second flexible beams. The second flexible beams provide a single degree of freedom of the Z mass blocks perpendicular to the moving direction of the driving pieces. The decoupling mass blocks are connected with the Z mass blocks through the third flexible beams. The third flexible beams provide a single degree of freedom of the decoupling mass blocks parallel to the moving direction of the driving pieces.

The MEMS gyroscope for three-axis detection of the present disclosure has four working modes. One is the drive mode; the other three modes are the X-axis sense mode, Y-axis sense mode, and Z-axis sense mode]. The angular velocity sensing principle of the MEMS gyroscope for three-axis detection of the present disclosure will be explained as follows in combination of the working modes thereof.

Figure 5:
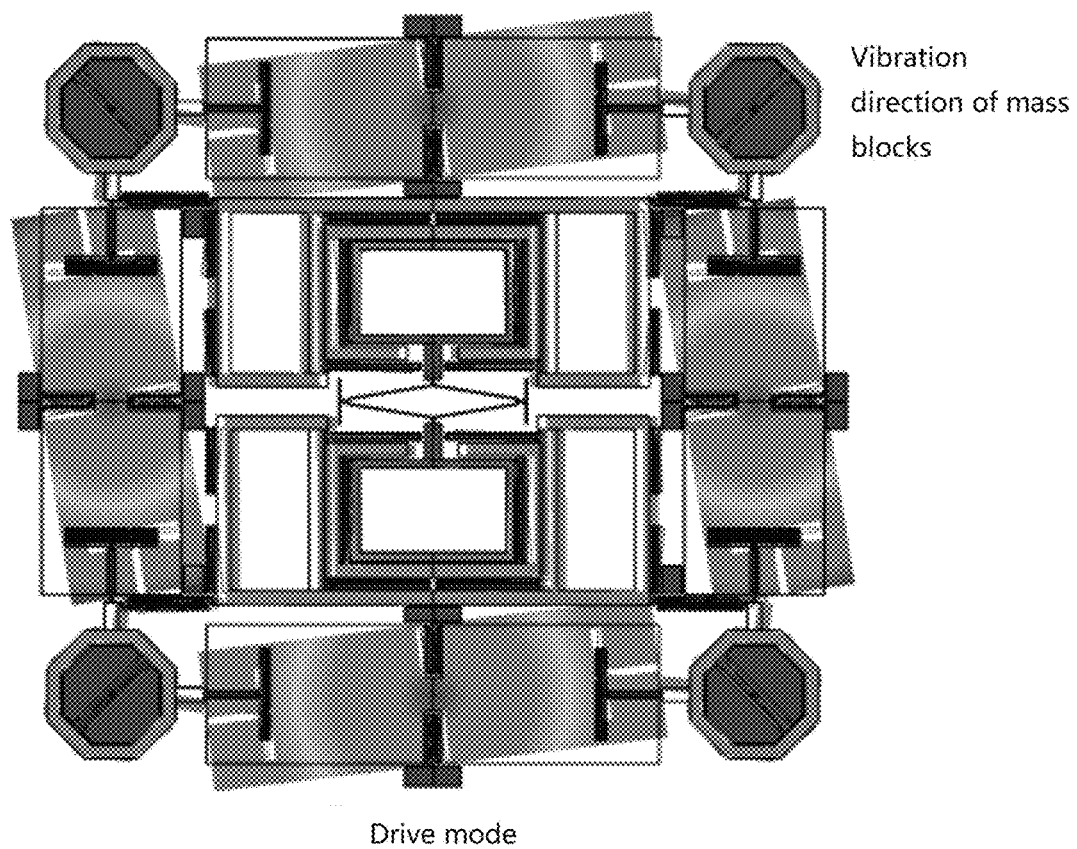
FIG. 5 is a schematic diagram showing an angle detection principle of a Z-axis where the MEMS gyroscope for three-axis detection is in a drive mode.
Figure 6:
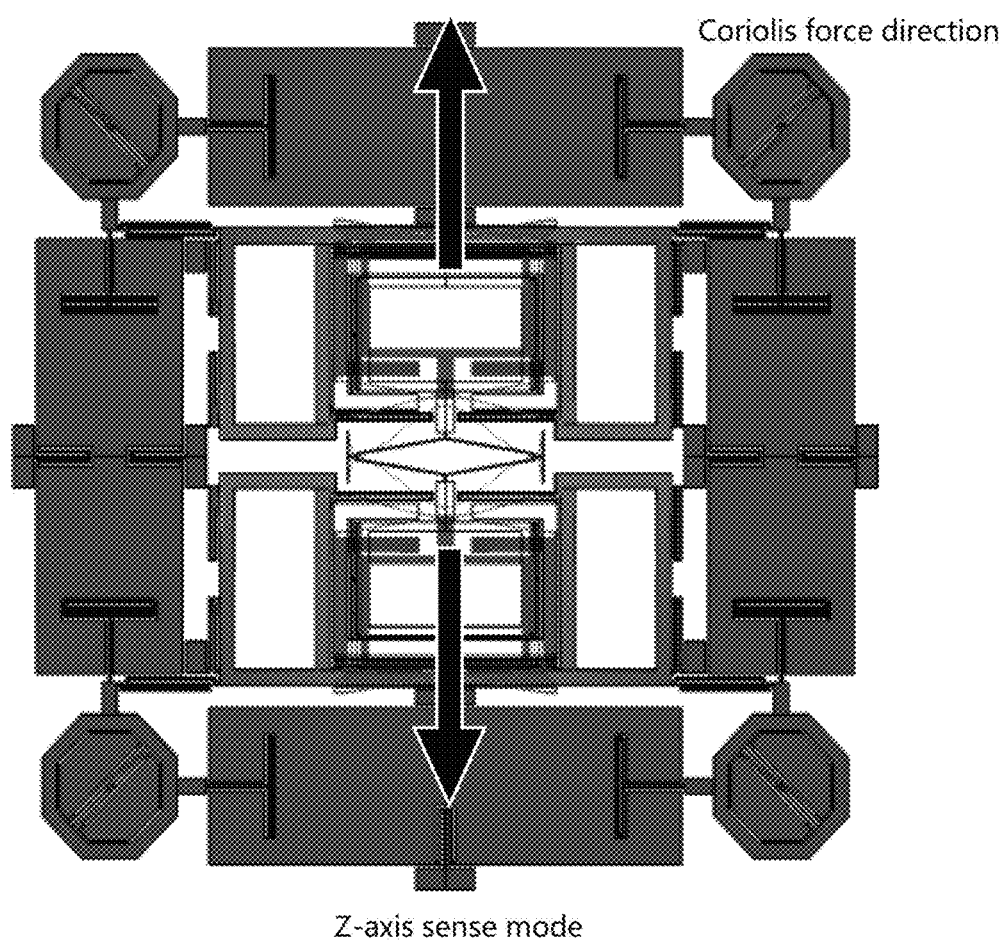
FIG. 6 is a schematic diagram showing the angle detection principle of the Z-axis where the MEMS gyroscope for three-axis detection is in a Z-axis sense mode.

FIG. 5 is a schematic diagram showing an angle detection principle of a Z-axis where the MEMS gyroscope for three-axis detection is in a drive mode. FIG. 6 is a schematic diagram showing the angle detection principle of the Z-axis where the MEMS gyroscope for three-axis detection is in a Z-axis sense mode. As shown in FIGS. 5 and 6, in a process of Z-axis angle detection, the MEMS gyroscope has two vibration modes. In the drive mode, the Z mass blocks move in a horizontal direction in the plane. In the Z-axis sense mode, the Z mass blocks move in a vertical direction in the plane. With an external driving force, the MEMS gyroscope is driven to vibrate in the drive mode. At this time, when the MEMS gyroscope of the present disclosure senses a Z-axis angular velocity ω, according to the Coriolis principle, the Z-axis angular velocity ω generates the Coriolis force along a Y-axis direction, and the Coriolis force forces the MEMS gyroscope of the present disclosure to vibrate in the Z-axis sense mode. Finally, a value of the Z-axis angular velocity ω is obtained by detecting a vibration displacement of the MEMS gyroscope of the present disclosure along the Y-axis direction.

Figure 7:
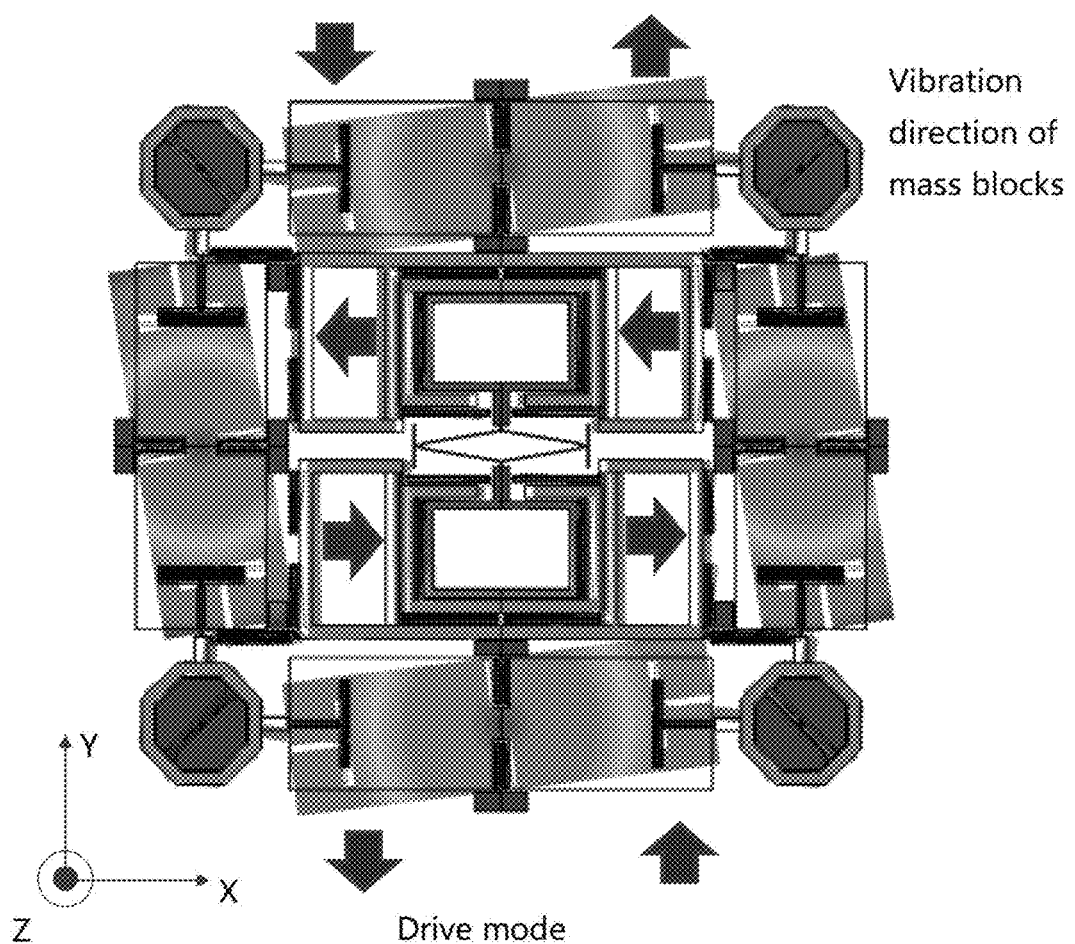
FIG. 7 is a schematic diagram showing an angle detection principle of an X-axis where the MEMS gyroscope for three-axis detection is in a drive mode.
Figure 8:
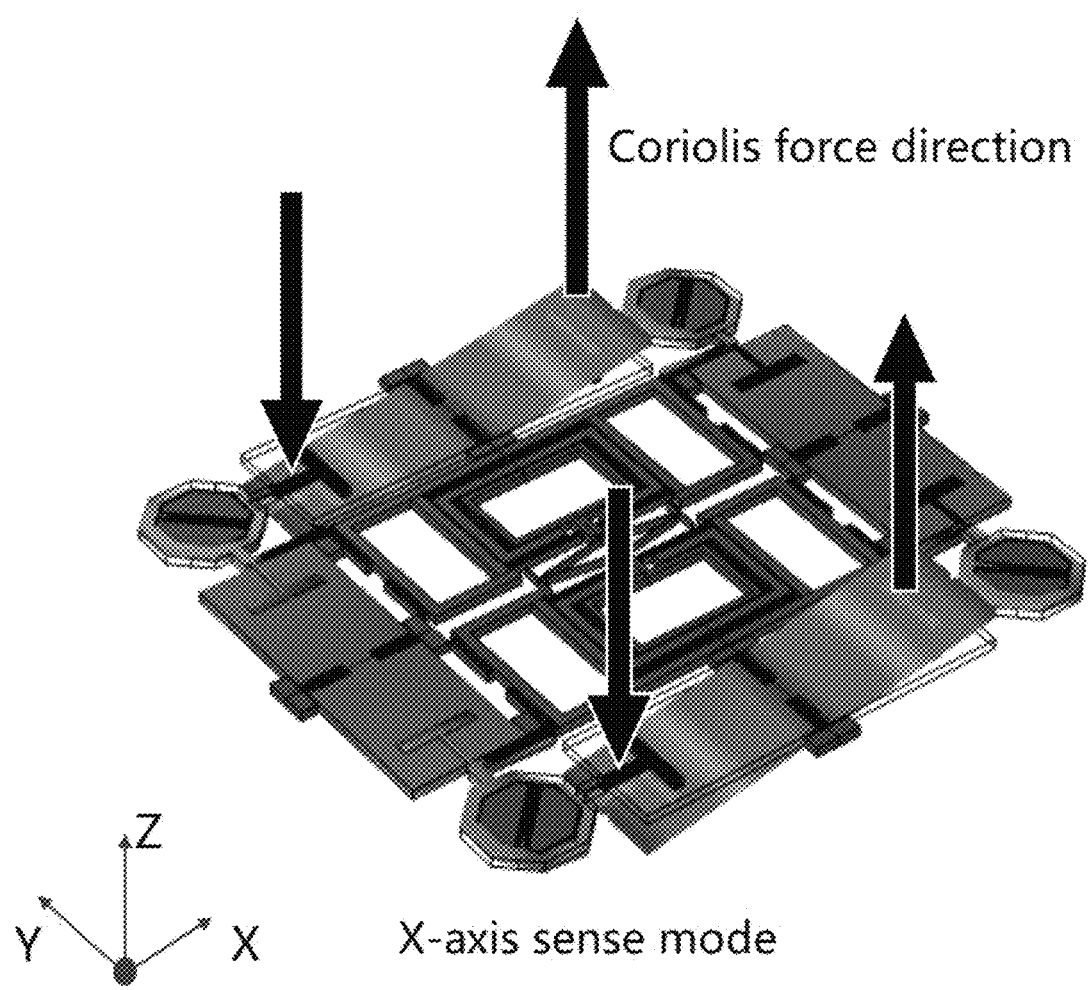
FIG. 8 is a schematic diagram showing the angle detection principle of the X-axis where the MEMS gyroscope for three-axis detection is in an X-axis sense mode.

FIG. 7 is a schematic diagram showing an angle detection principle of an X-axis where the MEMS gyroscope for three-axis detection is in a drive mode. FIG. 8 is a schematic diagram showing the angle detection principle of the X-axis where the MEMS gyroscope for three-axis detection is in an X-axis sense mode. As shown in FIGS. 7 and 8, in a process of X-axis angle detection, the MEMS gyroscope has two vibration modes. In the drive mode, the X and Y mass blocks move in the vertical direction. In the X-axis sense mode, the X and Y mass blocks vibrate out of the plane. With an external driving force, the MEMS gyroscope is driven to vibrate in the two modes. At this time, when the MEMS gyroscope of the present disclosure senses an X-axis angular velocity ω, according to the Coriolis principle, the X-axis angular velocity ω generates the Coriolis force along a Z-axis direction, and the Coriolis force forces the MEMS gyroscope of the present disclosure to vibrate in the X-axis sense mode. Finally, a value of the X-axis angular velocity ω is obtained by detecting a vibration displacement of the MEMS gyroscope of the present disclosure along the Z-axis direction.

Figure 9:
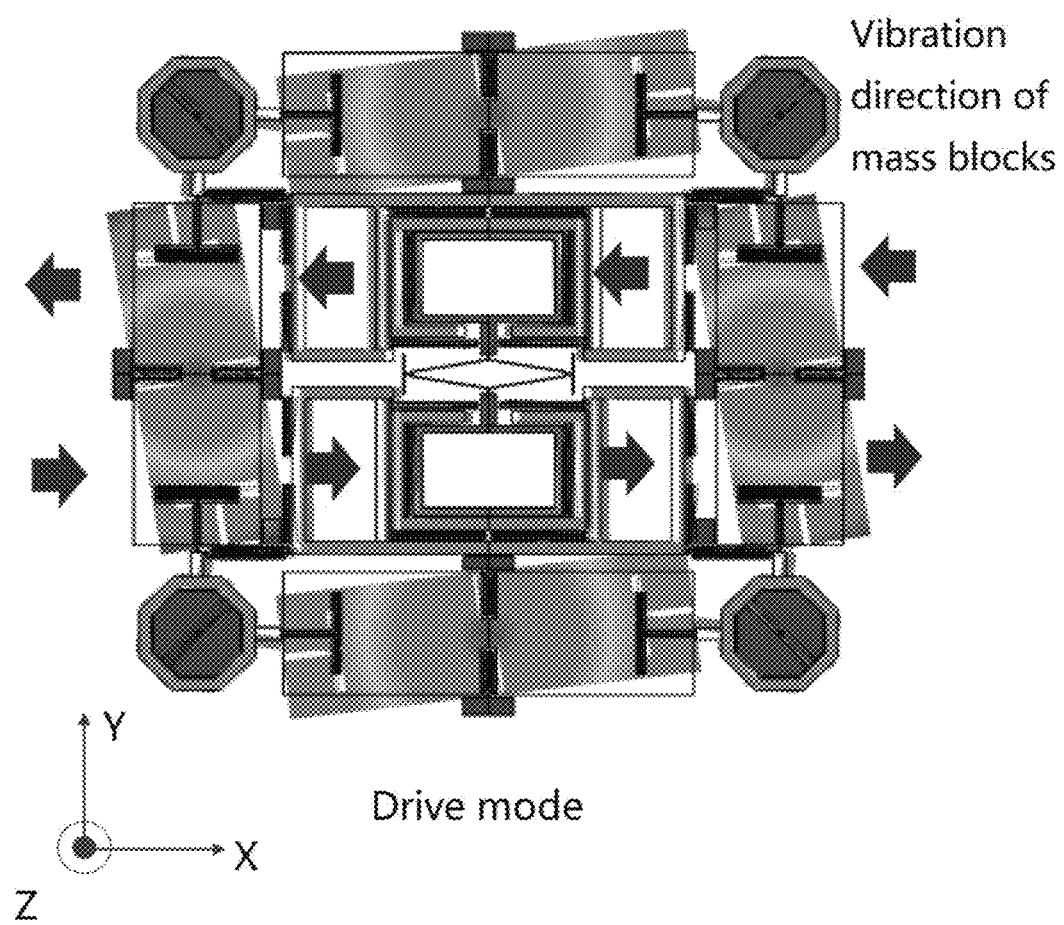
FIG. 9 is a schematic diagram showing an angle detection principle of a Y-axis where the MEMS gyroscope for three-axis detection is in a drive mode.
Figure 10:
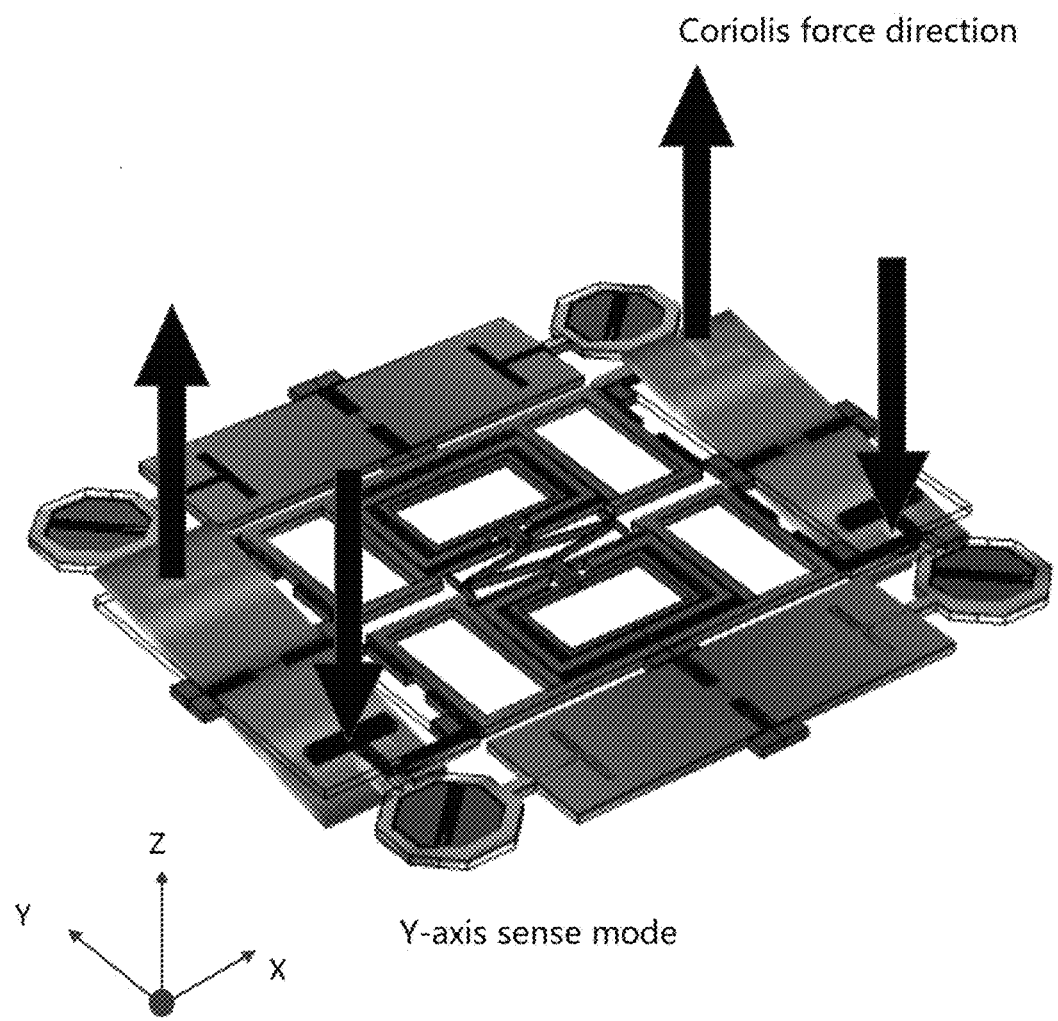
FIG. 10 is a schematic diagram showing the angle detection principle of the Y-axis where the MEMS gyroscope for three-axis detection is in a Y-axis sense mode.

FIG. 9 is a schematic diagram showing an angle detection principle of a Y-axis where the MEMS gyroscope for three-axis detection is in a drive mode. FIG. 10 is a schematic diagram showing the angle detection principle of the Y-axis where the MEMS gyroscope for three-axis detection is in a Y-axis sense mode. As shown in FIGS. 9 and 10, in a process of Y-axis angle detection, the MEMS gyroscope has two vibration modes. In the drive mode, the X and Y mass blocks move in the horizontal direction. In the Y-axis sense mode, the X and Y mass blocks vibrate out of the plane. With an external driving force, the MEMS gyroscope is driven to vibrate in the two modes. At this time, when the MEMS gyroscope of the present disclosure senses a Y-axis angular velocity ω, according to the Coriolis principle, the Y-axis angular velocity ω generates the Coriolis force along a Z-axis direction, and the Coriolis force forces the MEMS gyroscope of the present disclosure to vibrate in the Y-axis sense mode. Finally, a value of the Y-axis angular velocity ω is obtained by detecting a vibration displacement of the MEMS gyroscope of the present disclosure along the Z-axis direction.

In practical engineering practice, the MEMS gyroscope has several capacitors. The capacitors are configured to generate the external driving force required to force the MEMS gyroscope of the present disclosure to vibrate in the drive mode. The capacitors are configured to detect the vibration displacement of the MEMS gyroscope of the present disclosure along the vibration direction of the sense modes. The capacitors are further configured to suppress the quadrature error of the MEMS gyroscope of the present disclosure.

The above are only embodiments of the present disclosure. It should be pointed out that for those of ordinary skill in the art, improvements can be made without departing from the inventive concept of the present disclosure, which should all fall within the protection scope of the present disclosure.

What is claimed is:
1. A micro-electro-mechanical system (MEMS) gyroscope for three-axis detection, comprising:
  a substrate;
  a sensing unit elastically connected with the substrate; and
  a driving unit coupled with the sensing unit and driving the sensing unit to move;
  wherein the substrate is in a shape of a rectangle; the substrate comprises four anchor point structures respectively located at four corners of the substrate and four coupling structures respectively elastically connected with the four anchor point structures; and an avoiding space is formed between each two adjacent coupling structures;
  wherein the driving unit comprises two driving pieces located at inner sides of two opposite sides of the substrate; two ends of each of the two driving pieces are separately elastically connected with adjacent coupling structures; the two driving pieces are symmetrically arranged and are frame-shaped;

wherein the sensing unit comprises four X and Y mass blocks, two Z mass blocks, and two decoupling mass blocks; each of the four X and Y mass blocks is arranged in a corresponding avoiding space; the four X and Y mass blocks are respectively elastically connected with adjacent coupling structures to form a rectangular frame; each of the Z mass blocks is elastically connected with a corresponding driving piece and is arranged in the corresponding driving piece; each of the two decoupling mass blocks is elastically connected with a corresponding Z mass block and is arranged in the corresponding Z mass block; the two decoupling mass blocks are elastically connected with each other.

2. The MEMS gyroscope for three-axis detection according to claim 1, wherein each of the anchor point structures comprises a plurality of sub-anchor points with a same shape and arranged at intervals; each of the coupling structures comprises a coupling ring sleeved on outer sides of corresponding sub-anchor points; an inner side of each coupling ring extends inward toward a space between the corresponding sub-anchor points to form first coupling beams connected with the corresponding sub-anchor points; the first coupling beams of each coupling ring extend inward toward the space of the corresponding sub-anchor points.

3. The MEMS gyroscope for three-axis detection according to claim 2, wherein each of the X and Y mass blocks comprises first coupling connecting positions close to a corresponding coupling structure; each of the coupling structures further comprises connecting portions extending outward from an outer side of each coupling ring and first flexible beams; each of the first flexible beams extends from one end of a corresponding connecting portion to a corresponding first coupling connecting position and is connected with a corresponding X and Y mass block.

4. The MEMS gyroscope for three-axis detection according to claim 2, wherein each of the driving piece comprises corner portions; an outer wall of each of the corner portions close to a corresponding coupling ring extends outward to form a connecting beam, one end of each connecting beam away from a corresponding driving piece is connected with an outer wall of a corresponding coupling ring.

5. The MEMS gyroscope for three-axis detection according to claim 4, wherein the substrate further comprises driving piece anchor points; each of the driving piece anchor points is arranged between one end of a corresponding driving piece and a corresponding X and Y mass block; each of the driving piece comprises four corner portions; a guiding beams is formed on an outer wall of each of the corner portions; each guiding beam is perpendicular to a moving direction of a corresponding driving piece; one end of each guiding beam away from the corresponding driving piece is connected with a corresponding driving piece anchor point; each guiding beam is arranged between a gap between an outer wall of the corresponding driving piece and an inner wall of a corresponding X and Y mass block.

6. The MEMS gyroscope for three-axis detection according to claim 1, wherein each of the Z mass blocks is arranged in the corresponding driving piece; each of the Z mass blocks is a frame structure; an outer wall of each of the Z mass blocks and an inner wall of the corresponding driving piece are spaced apart to form a gap; outer walls of four corners of each of the Z mass blocks extend to form second flexible beams; one end of each of the second flexible beams away from each of the Z mass blocks is connected with a corresponding driving piece.

7. The MEMS gyroscope for three-axis detection according to claim 6, wherein each of the decoupling mass blocks is a frame structure; a shape of the decoupling mass blocks matches a shape of the Z mass blocks; each of the decoupling mass blocks is embedded in the corresponding Z mass block and is spaced from the corresponding Z mass block to form a narrow slit; outer walls of two symmetrical frames of each of the decoupling mass blocks extend outward to form third flexible beams; the third flexible beams of each of the decoupling mass blocks are arranged in the narrow slit of the corresponding Z mass block and are connected with inner walls of the corresponding Z mass block.

8. The MEMS gyroscope for three-axis detection according to claim 7, wherein a second coupling beam is elastically connected between the two decoupling mass blocks; a long narrow slit is formed between the two driving pieces; the second coupling beam is arranged in the long narrow slit; the substrate further comprises coupling beam anchor points; the coupling beam anchor points are arranged on two ends of the second coupling beam; the two ends of the second coupling beam are connected with the coupling beam anchor points.

9. The MEMS gyroscope for three-axis detection according to claim 1, wherein the X and Y mass block are in a shape of a rectangular strip; and the substrate further comprises mass anchor points arranged at intervals at center points of the X and Y mass blocks, a mass flexible beam extends from a center point of each of the X and Y mass blocks to connect with a corresponding mass anchor point.

10. The MEMS gyroscope for three-axis detection according to claim 1, wherein a driving transducer is arranged in each of the driving piece; an X and Y surface detecting transducer is arranged in each of the X and Y mass blocks, and a Z surface detecting transducer is arranged in each of decoupling mass block connected with the corresponding Z mass block.

\* \* \* \* \*